United States Patent [19]

Heinrich et al.

[11] 4,024,103

[45] May 17, 1977

[54] STABILIZED POLYOLEFIN MOLDING COMPOSITION

[75] Inventors: Rudolf Heinrich, Fischbach, Taunus; Hans-Jerg Kleiner, Kronberg, Taunus, both of Germany

[73] Assignee: Hoechst Aktiengesellschaft, Frankfurt am Main, Germany

[22] Filed: Sept. 2, 1975

[21] Appl. No.: 609,675

[30] Foreign Application Priority Data

Sept. 4, 1974  Germany .......................... 2442390

[52] U.S. Cl. .................... 260/45.7 P; 260/45.95 D; 260/45.95 L; 260/45.95 R; 260/502.4 P
[51] Int. Cl.² ........................................ C08K 5/53
[58] Field of Search ............... 260/45.7 P, 45.95 D, 260/45.95 L

[56] References Cited

UNITED STATES PATENTS

| | | | |
|---|---|---|---|
| 2,230,371 | 2/1941 | Bolton | 260/45.7 |
| 2,635,112 | 4/1953 | Fields | 260/45.9 |
| 3,471,552 | 10/1969 | Budnick | 260/502.4 |
| 3,493,538 | 2/1970 | Salyer et al. | 260/45.95 |
| 3,749,694 | 7/1973 | Cantatore et al. | 260/41 |
| 3,894,986 | 7/1975 | Racky et al. | 260/45.7 |
| 3,954,847 | 5/1976 | Hofer et al. | 260/502.4 P |

*Primary Examiner*—Melvyn I. Marquis
*Assistant Examiner*—R. A. White
*Attorney, Agent, or Firm*—Curtis, Morris & Safford

[57] ABSTRACT

A polyolefin molding composition having an excellent stability to light, to heat and of its color shade is obtained by adding to the polyolefin from 0.01 to 2 weight %, calculated on the polyolefin, of a compound of diphosphonic acid or diphosphinic acid.

5 Claims, No Drawings

STABILIZED POLYOLEFIN MOLDING COMPOSITION

It is a known fact that polyolefins are subject to degradation by the influence of light, oxygen and/or heat, unless they are sufficiently stabilized. Therefore, a large number of suggestions have been made so far concerning specific compositions which may be used as stabilizers for polyolefins, among them being phenolic anti-oxidants, thioether or dithioether compounds, organic phosphites as oxidation and heat stabilizers and benzophenone and triazol compounds as light stabilizers. It has also been suggested to use as stabilizers derivatives of phosphonic or phosphinic acids (U.S. Pat. No. 2,230,371, German Pat. No. 1,210,855 and Belgian Pat. No. 617,194).

Recently the use of derivatives of diphosphonic acids as additives to polyolefins has also been described. German Offenlegungsschrift 2,122,069 specifies that organic nickel compounds are efficient light stabilizers particularly in the presence of organic sulfur compounds; the polyolefins stabilized in this way have a highly disadvantageous tendency at elevated processing temperatures to become darker in color, a color alteration which may be avoided completely or at least reduced considerably by adding simultaneously certain derivatives of phosphonic acid or diphosphonic acid. The entire specification deals exclusively with the problem of how to prevent the black discoloration of the polyolefin compositions due to the formation of nickel sulfide; it does not answer the question whether said derivatives of diphosphonic acid may contribute as such to the stabilization of the polyolefins and whether they may show any other noticeable effect in polyolefin compositions which do not contain any nickel compounds and hence do not make it necessary to overcome the problem of the formation of nickel sulfide compounds.

It has now been found that the heat and light stability of polyolefins may be considerably improved by addition of certain derivatives of diphosphonic acids or diphosphinic acids. The molding composition obtained in such a way show an improved light stability in comparison to known stabilized polyolefin molding compositions, an excellent stability to processing and a good color stability.

Surprisingly, the effect of the diphosphorus compounds is much better than that of the monophosphorus compound which had been employed in the past.

Subject of the present invention is, therefore, a molding composition of a polyolefin and from 0.01 to 2 weight %, preferably from 0.05 to 1 weight %, calculated on the polyolefin, of a compound having formula

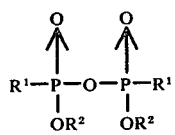

or of a compound having formula

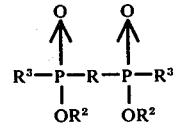

in which:
- R = alkylene group having from 1–18, preferably from 1–10 carbon atoms or an arylene radical, preferably a phenylene radical,
- $R^1$ = alkyl group having from 1–18, preferably from 1–6 carbon atoms, aryl group or alkylaryl group having from 6–18 carbon atoms,
- $R^2$ = H, $R^1$, $N(R^4)_4$, or a metal, preferably Na, K, Ca, Mg or Zn,
- $R^3$ = $R^1$ or $OR^2$ and
- $R^4$ = independently from each other either H, alkyl having from 1–4 carbon atoms or aryl, preferably phenyl, and whereby the radical R and $R^1$ may also be substituted by halogen, —OH, —NH$_2$, —CONH$_2$ or —COOH.

The good effect of stabilization with derivatives of diphosphonic acids and diphosphinic acids may be further improved by a supplementary addition of from 0.01–5 weight %, calculated on the polyolefin, of known stabilizers.

Particularly suitable for this purpose are especially known phenolic anti-oxidants such as phenols subject to steric hindrance, condensation products of aldehydes or ketones with monoalkyl phenols or dialkyl phenols, substituted diphenyl sulfides and specifically phenol-alkanoic acid esters or diphenol-alkanoic acid esters such as are described in German Patent Specifications 1,163,017 and 1,286,041.

To the polyolefin molding composition may further be added as supplementary stabilizer an organic monosulfide or disulfide, e.g. didodecyl sulfide, dioctadecyl sulfide, thiodipropionic acid lauryl ester, dioctyl disulfide, didodecyl disulfide or dioctadecyl disulfide.

The light fastness and the color quality may be further improved by addition of derivatives of benzophenone and organic phosphites. For facilitating the processing of the polyolefin molding composition, a salt of an aliphatic carboxylic acid, e.g. calcium stearate or zinc stearate is added in amount of from 0.05 to 5 weight %, calculated on the polyolefin.

As the following experiments show, the polyolefin molding composition stabilized in such a way has an excellent stability to light; its stability to heat and its color quality are also good. The shaped articles manufactured therefrom do not change color even when exposed to sunlight for a long time and they do not show any tendency to become brittle or yellowish.

The stabilizers may be mixed into the polyolefins by usual processes, for example, by spraying a stabilizer solution onto the powder and by subsequent granulation of the mixture, or by blending them into the molten mass or by means of a concentrate which is then diluted to the desired concentration with further quantities of polyolefin.

The molding composition of the invention may be processed in accordance with known processing methods, for example by pressing, injection molding or extrusion. Usual additives such as lubricants, pigments, fillers, glass fibers, flame-retardant agents and antistatic agents may be added.

The molding composition according to the invention is especially satisfactory for outdoor-use purposes, due to its particularly good light-fastness and color stability. Besides, the stability to heat — even in the presence of air or oxygen — of the molding composition according to the invention is so excellent that it is also suitable for the manufacture of shaped articles that are to be exposed to elevated temperatures for a long period.

Especially suitable polyolefins for the molding composition as per the invention are low pressure polyolefins, e.g. polyethylene, polypropylene, polybutene-(1), and poly-4-methyl-pentene-(1) and the copolymers of α-olefins blended with each other as with ethylene or with minor quantities of other monomers.

The following examples illustrate the invention:

EXAMPLE 1

100 parts of low pressure polyethylene (density 0.947 g/cm$^3$, melting index $MFI_{190/5}$ = 0.5 g/10 min) were blended with the stabilizers specified in table 1 and granulated at temperatures of from 200° to 250° C. Test specimens were pressed from the granulate and subjected to the influence of light for up to 1000 hours in a test apparatus equipped with a xenon — arc lamp, while periodically being artificially sprinkled. (pre-standard: DIN 53,387). After various periods of time the test specimens were subjected to IR spectrographic control for measuring the CO figure. The CO figure is the ratio of IR extinction at 5.80 μm to the IR extinction at 4.95 μm and is a test measurement for the CO content of the test specimens, i.e. for the oxidation that has occured. Furthermore, at the end of 1.000 hours of exposure to light the tensile strength according to DIN 53,455 and the impact-tear strength according to DIN 53,448 were measured and indicated in the table in % of the initial values. The last column of the table shows the intensity of the yellow shades of the test specimens prior to and after a 7 days' storage at 100° C in a drying cabinet.

The test specimen 1 according to the invention starts to become brittle only after 750–1000 hours of exposure to light. The molding composition (test specimen 2) may be further improved by adding simultaneously an anti-oxidant.

For comparison's sake test specimen 3 shows that with the addition of only the phenolic anti-oxidant a clearly higher content of CO is found after 250 hours.

The stability of test specimen 3 can be improved but slightly by a supplementary addition of monophosphinic acid (test specimen 4).

EXAMPLE 2

100 parts of low pressure polyethylene (density — 0.954 g/cm$^3$, melting index $MFI_{190/5}$ = 1.3 g/10 min) were blended with the stabilizers specified in table 2 and processed to yield test specimens as per the description of example 1, for testing. For easier processing 0.2% of calcium stearate is added to all test specimens. The test shows the good stabilizing effect of the derivatives oxidiphosphonic acid alone and combined with a phenolic anti-oxidant.

EXAMPLE 3

100 parts of the same low pressure polyethylene as per example 2 were stabilized with 0.05 parts each of β-(3,5-di-tert.-butyl-4-hydroxyphenyl)-propionic acid-n-octadecyl ester, of 0.2 parts of calcium stearate and 0.2 parts of the phosphorus compunds specified in table 3. The molding compositions were processed as per the description of example 1 to yield test specimens, then exposed to light for 1,000 hours under a xenon-arc lamp. Table 3 shows the CO-figure after the exposure to light.

The decane — 1,10-dimethyl phosphinic acid specified in table 3 was prepared as follows:

a. Preparation of decane-1,10-dimethyl phosphinic acid isobutylester

A mixture of
280 g of methane phosphonous acid isobutyl ester and
120 g of isobutanol was heated under nitrogen to 160° C and a mixture of
142 g of decadiene-1,9 and
2 g of di-tert.-butylperoxide was added dropwise for about 1 hour and a half while stirring vigourously. Stirring was continued for another hour and the mixture subject to distillation at 0.4 mm/Hg at an interior temperature of up to 200° C.
380 g of decane-1,10-dimethyl phosphinic acid-isobutyl ester were retained, at a setting point of 42° C.

The yield obtained was 90% of the theoretical yield.

b. Preparation of decane-1,10-dimethylphosphinic acid
Hydrogen chloride was introduced into
380 g of decane-1,10-dimethylphosphinic acid isobutyl ester at a temperature of from 130° C to 200° C, while stirring vigourously. Isobutyl chloride was distilled off. At the end of the reaction excess hydrogen chloride was eliminated by means of a water jet vacuum, at 200° C; after 2 hours the batch was cooled to the setting point, then subject to recrystallization from isopropanol/water.
250 g of decane-1,10-dimethylphosphinic acid were obtained, melting point 141°–145° C, corresponding to a yield of 85% of the theoretical yield.

TABLE 1

| Stabilizer | Wt. - % | CO-figure after hours | | | | | tensile strength after 1000 hrs. % | impact strength after 1000 hrs. % | Yellow shade intensity prior after 7 days at 100° C | |
|---|---|---|---|---|---|---|---|---|---|---|
| | | 0 | 250 | 500 | 700 | 1000 | | | | |
| Ethane-1,2-di-methylphosphinic acid | 0.2 | 0.4 | 0.4 | 0.6 | 0.8 | 1.1 | 90 | 58 | −8.7 | −2.0 |
| Ethane-1,2-di-methylphosphinic acid +β-(3,5-di-tert.-butyl-4-hydroxy-phenyl)-propionic acid-n-octadecyl ester | 0.2 0.5 | 0.4 | 0.4 | 0.5 | 0.8 | 1.0 | 90 | 64 | −8.9 | −2.1 |
| β-(3,5-di-tert.-butyl-4-hydroxy-phenyl)-propionic acid-n-octadecyl-ester (comparison) | 0.05 | <0.2 | 0.7 | 2.5 | 6.5 | >10 | 42 | 11 | −6.1 | +2.2 |

TABLE 1-continued

| Stabilizer | Wt. - % | CO-figure after hours 0 | 250 | 500 | 700 | 1000 | tensile strength after 1000 hrs. % | impact strength after 1000 hrs. % | Yellow shade intensity prior 7 days at 100° C | after 7 days at 100° C |
|---|---|---|---|---|---|---|---|---|---|---|
| β-(3,5-di-tert.-butyl-4-hydroxy-phenyl)-propionic acid-n-octadecyl ester | 0.05 | 0.3 | 0.5 | 0.9 | 1.5 | 2.9 | 63 | 15 | — | — |
| +dimethylphosphinic acid (comparison) | 0.2 | | | | | | | | | |

TABLE 2

| Stabilizer | Wt.-% | CO-figure after hours 0 | 250 | 500 | 750 | 1000 | tensile strength after 1000 hrs. % | impact strength after 1000 hrs. % |
|---|---|---|---|---|---|---|---|---|
| Ethane-1,2-di-phosphonic acid | 0.2 | 0.4 | 0.4 | 0.6 | 0.8 | 1.2 | 82 | 62 |
| Ethane-1,2-di-phosphonic acid +4,4'-thio-bis-(3-methyl-6-tert.-butyl-phenol | 0.2 0.05 | 0.4 | 0.4 | 0.6 | 0.9 | 1.3 | 85 | 68 |
| 4,4'-thio-bis-(3-methyl-6-tert.-butyl-phenol) (comparison) | 0.05 | <0.2 | 0.9 | 2.4 | 6.2 | >10 | 45 | 9 |

TABLE 3

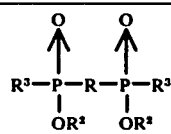

| —R— | —R² | —R³ | CO-figure after 1000 hours |
|---|---|---|---|
| —CH₂—CH₂— | —H | —CH₃ | 1.0 |
| —CH₂—CH₂— | —H | —OH | 1.2 |
| —CH₂—CH₂— | —H | —C₆H₅ | 1.5 |
| —CH₂— | —H | —C₆H₅ | 1.4 |
| —C₆H₄— | —H | —CH₃ | 0.9 |
| —C(CH₃)(OH)— | —H | —CH₃ | 2.5 |
| —CH₂—CH₂— | —C₄H₉ | —CH₃ | 3.0 |
| —CH₂—CH₂— | —CH₃ | —OCH₃ | 1.3 |
| —CH₂—CH₂— | —Na | —OCH₃ | 1.5 |
| —C(CH₃)(OH)— | —H | —OH | 1.2 |
| —CH₂—CH₂— | =Ca | —OH | 1.8 |
| —C₁₀—H₂₀— | —H | —CH₃ | 1.6 |
| C₂H₅—P(=O)(OCH₃)—O—P(=O)(OCH₃)—C₂H₅ | | | 2.1 |

What is claimed is:

1. A molding composition of a polyolefin and from 0.01 to 2 weight %, based on the weight of polyolefin, of a compound of the formula

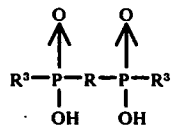

in which
R is alkylene of 1 to 18 carbon atoms or arylene,
R³ is alkyl of 1 to 18 carbon atoms, aryl or alkylaryl of 6 to 18 carbon atoms, or OH, and/
R³ may also be substituted by halogen or OH.

2. A molding composition as defined in claim 1 in which R is an alkylene of from 1 to 10 carbon atoms or phenylene and R³ is alkyl of 1 to 6 carbon atoms, phenyl or hydroxy.

3. A molding composition according to claim 1 wherein R is —CH₂CH₂— and R₃ is methyl.

4. A molding composition according to claim 1 wherein R is —CH₂CH₂— and R₃ is OH.

5. Molding composition of a polyolefin according to claim 1 which contains additionally from 0.01 to 5 weight %, calculated on the polyolefin, of a known phenolic anti-oxidant stabilizer.

* * * * *